United States Patent
Nigg

[15] 3,704,779
[45] Dec. 5, 1972

[54] FOOD SERVICE TRAY WITH CUTLERY

[72] Inventor: Paul Nigg, Altstatten, Switzerland

[73] Assignee: Ego Werke AG, Altstatten, Switzerland

[22] Filed: Sept. 28, 1970

[21] Appl. No.: 76,091

[30] Foreign Application Priority Data

Jan. 30, 1970 Switzerland..........................1320/70

[52] U.S. Cl..............206/47 R, 206/56 AB, 220/4 E, 220/85 D, 220/94 A, 220/97 C

[51] Int. Cl........................B65d 79/00, B65d 83/00

[58] Field of Search....206/47 R, 56 AB, 4; 220/23.6, 220/23.8, 4 E, 97 R, 97 F, 85 D, 97 C, 94 A

[56] References Cited

UNITED STATES PATENTS

| | | | |
|---|---|---|---|
| 3,565,245 | 2/1971 | Asher | 206/47 R |
| 2,743,011 | 4/1956 | Woofter | 206/56 AB |
| 3,326,408 | 6/1967 | Ringlen | 220/97 F |
| 3,191,796 | 6/1965 | Schwartz et al. | 220/23.6 |
| 3,349,937 | 10/1967 | Duff et al. | 220/23.6 |
| 3,438,486 | 4/1969 | Pinkas | 206/56 AB |
| 3,107,781 | 10/1963 | Nack | 206/47 R |
| 3,381,876 | 5/1968 | Biggins | 206/47 R |
| 3,122,265 | 2/1964 | Innis | 206/4 |
| 2,034,940 | 3/1936 | Butler | 220/85 D |
| 3,057,510 | 10/1962 | Blacker | 220/23.6 |

FOREIGN PATENTS OR APPLICATIONS

| | | | |
|---|---|---|---|
| 1,408,476 | 7/1965 | France | 220/23.8 |

Primary Examiner—Joseph R. Leclair
Assistant Examiner—Stephen Marcus
Attorney—Flynn & Frishauf

[57] ABSTRACT

Throw-away food service tray made of plastic material, with integral break-off cutlery, the device comprising a substantially rectangular receptacle for containing food items, a knife, a fork and a spoon, the three cutlery pieces being protected by a surrounding reinforced frame and arranged so that they can easily be broken out by hand by the user.

8 Claims, 3 Drawing Figures

PATENTED DEC 5 1972 3,704,779
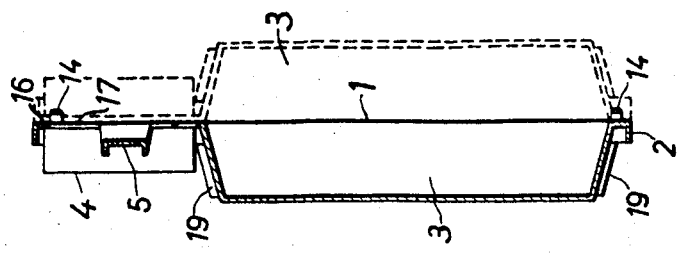
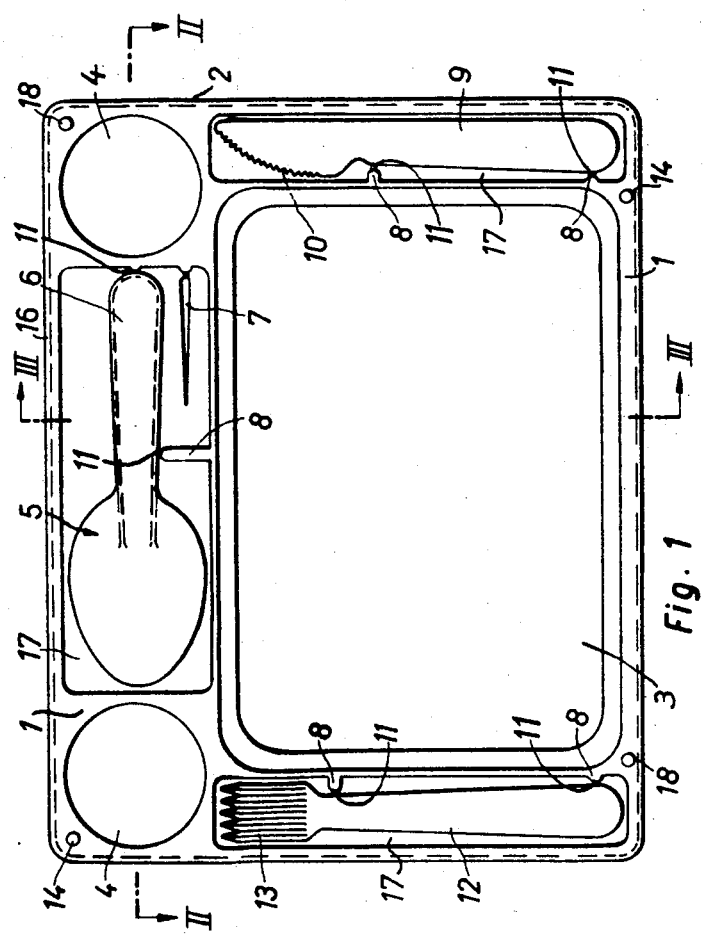
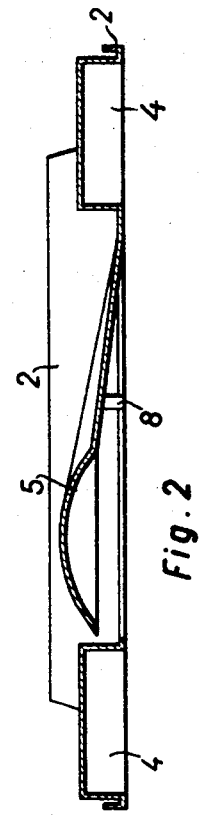

FOOD SERVICE TRAY WITH CUTLERY

The invention relates to a novel food service tray device made of synthetic plastic materials, having recesses for containing foods, beverage vessels and the like.

For serving foods at picnics, camping sites and the like, it is desirable to have means available which allow the food to be served conveniently without the use of fragile plates and dished and the like, which subsequently have to be washed, together with the corresponding cutlery. Single use plates and dishes made of paperboard or plastic which are used once and then thrown away are known. They have however the disadvantage that they are not suitable for hot foods and in many cases they have been found impractical in use. The cutlery, such as knives, forks and spoons, have to be provided separately and must be washed and taken home again.

It is an object of the present invention to provide a throw-away food service tray with integral cutlery, which can be manufactured as a single piece of plastic material at little cost.

It is another object of the invention to provide a food service tray, in which the cutlery is joined by easily breakable joints, so that the individual pieces of cutlery can be separated from the tray before use, simply by breaking them off.

It is a further object of the invention to provide means for combining two identical food service trays which when placed in opposed relation relative to each other define a cavity therebetween, to serve as a receptacle for food refuse and used cutlery therein.

Another object of the invention is to provide a tray which is so constructed that a number of items together with the cutlery may be conveniently stacked in a partially nested condition for compact storage or transportation.

The invention itself may be best understood by reference to the following description when taken in accordance with the following and accompanying drawing, wherein:

FIG. 1 is a plan view of the device;

FIG. 2 is a cross section taken along the line II—II IN FIG. 1;

FIG. 3 is a cross section taken along the line III—III in FIG. 1.

The device is a single-piece plastic injection moulding, for example of polystyrol, and consists of a substantially flat main tray part 1 or top panel, surrounded by a downwardly extending rim flange 2. The central part of the main tray part 1 contains an essentially rectangular depression or recess 3 which forms a receptacle with a flat bottom, for containing food, the capacity of this receptacle or compartment being approximately that of an ordinary soup plate. The side walls of the recess 3 are inwardly inclined to facilitate stacking with a second and identical receptacle as when in telescopic relation. Near the corners, at the back part of the tray there are two cylindrical recesses 4 with flat bottoms, for separately receiving other foods, or for supporting beverage vessels, or they can be used for receiving food residues or the like. Between the two recesses 4 and parallel to the longer side of the recess 3 a spoon 5 with a handle 6 is arranged. The spoon is supported by projections 8, containing narrow plastic bridges 11 which can easily be broken by the user. The plastic bridges 11 are quite small in cross section, to permit easy fracturing by the user, without the need of employing a tool for the purpose. The user merely breaks the spoon 5 away from the main tray part 1, when he wishes to use the spoon. Parallel to the handle 6 of the spoon there is a toothpick 7, which can also easily be broken off by fracturing the neck or bridge 11 between the toothpick 7 and its supporting projection 8.

In the rim of the main tray part 1, on the right, there is a knife 9 equipped with knife edge 10 of a blade. The knife 9 is attached to two projections 8, which project outwards from the main tray part 1, by breakable bridges 11 of small cross section, allowing the knife to be broken away easily by the user, from the main tray part 1. The knife edge 10 can if desired have teeth, at least over a part of its length, to facilitate cutting, or the blade can take the form of a steel blade imbedded in the plastic holder during the injection process.

On the left, in the rim of the main tray part 1 there is a fork 12 with prongs 13. The fork 12, like the knife 9, is attached to two projections 8 of the main tray part 1 by breakable bridges 11 or necks. The spoon 5, the knife 9 and the fork 12 are each surrounded along the whole circumference by empty spaces 17, apart from the locations where they are joined to the main tray part 1 by necks or bridges 11. Each cutlery piece is joined to the main tray part 1 at one side only of the longitudinal axis of the cutlery piece to provide a lever arm to facilitate the breaking out of the cutlery by the user.

It would however also be possible that the projections 8 with the bridges were extending from the rim 2 or rim side.

The device according to the invention is arranged so that two devices can be detachably secured together, the one inverted over the other, to form a closed container or hollow space for receiving refuse, after the repast, for example waste paper, bones and the like, having twice the capacity of a single recess 3. The recess 3 is symmetrical about its transverse axis. The arrangements for attaching the two devices together, the one inverted over the other, are as follows. Each main tray part 1 has, near diagonally opposite corners, two upward projecting conical studs 14 or other anchoring members. Near the other two corners there are corresponding members which serve to selectively engage with complementary members provided within a second and identical tray, so that the trays can be detachably secured to each other. To attach two devices together, one inverted over the other, the two studs 14 of the one device are squeezed firmly into the two holes 18 of the other device, the two devices being held together securely by the jamming action.

It should be observed that after the spoon 5 has been removed there remains an aperture through which the user can thrust the hand, so that a carrying handle is obtained, the edge 16 of the main tray part 1 acting as a lifting strap.

To facilitate stacking of a number of such trays, and to provide a secure stack of the least possible height, the walls of the recess 3 have external spacer ribs 19.

The downward rim flange 2 has the function to stiffen the main tray part 1 and to protect the users finger from the fork prongs 13 and the cutting edge of the knife. Further the flanged rim prevents the cutlery from being broken out prematurely and inadvertently before intended use. The pieces of cutlery are dimensioned so that after use they can be stowed away in the essentially rectangular, or if desired approximately oval receptacle 3. Each cutlery piece is therefore shorter than the length of the receptacle 3.

The throw-away food service tray with integral breakoff cutlery, has a wide field of applications, in addition to its application for picnic and camping purposes. In particular it can be used in country fairs, exhibitions and the like, in organized country outings and in passenger aircraft for serving airborne meals. The tray can be held between the knees or supported by a table or the like, on which it rests securely supported by the flat bottom of the recess 3.

It will be understood that the present invention is not limited to the specific materials, steps and other specific details described above and may be carried out with various modifications without departing from the scope of the invention as defined in the appended claims.

What is claimed is:

1. Food service tray made of plastic material having a top panel;
   at least one integral recess for receiving food formed in said top panel;
   a rim surrounding said top panel;
   a cut-out formed in said panel and located between the recess and a first side of the panel and substantially symmetrically with respect to opposite sides of the panel which are disposed laterally with respect to said first side, said cutout having an edge essentially parallel to the rim of said top panel and forming an essentially smoothly extending line;
   cutlery means arranged in said cut-out and forming an integral part of said tray;
   breakable attaching means retaining said cutlery means in the cut-out whereby, when the cutlery means are removed from the panel, the first side of the panel will form a handle for carrying the tray;
   and means to detachably secure a respective pair of identical food service trays in opposed and superposed relation, one relative to the other, so that a closed container is formed, said means comprising projecting engagement means and corresponding depressed engagement means, so that the projecting means of the one tray can be placed into jamming engagement with the depressed engagement means in the other tray, the adjacently located first sides of the oppositely placed panels forming a combined carrying handle.

2. Tray according to claim 1, wherein the tray is essentially rectangular, further cut-outs are formed in said panel, and the cutlery means comprises a spoon, a fork and a knife, said spoon being positioned between the rear longitudinal edge of the approximately rectangular recess and in essentially parallel relation with said first side, said knife and said fork being arranged in said further cut-outs and positioned along the lateral sides forming the shorter sides of said rectangular tray.

3. Tray according to claim 2, wherein the lengths of the knife and the fork are approximately equal to the width of said recess, the knife being positioned on one lateral side and the fork on the other lateral side of said recess.

4. Tray according to claim 2, wherein each piece of said cutlery means has a length less than the length of said recess.

5. Tray according to claim 1, wherein said recess has sloping side walls, and the outer surface of said sloping recess walls are formed with ribs to prevent lateral movement to each other of said trays in stacked position.

6. Tray according to claim 1, wherein said breakable attaching means for the cutlery means comprises at least two narrow, easily fractured necks extending from projections on the same side of the longitudinal central axis of each of the cutlery means.

7. Tray according to claim 1, wherein said panel comprises two further circular recesses located adjacent the corners of said first side and, one recess, each, being disposed between a respective end of said cut out and a lateral side of the tray.

8. Disposable food service tray-cutlery combination made of plastic material having
   an essentially rectangular top panel;
   at least one integral recess for receiving food formed in said top panel;
   a rim surrounding said top panel having a downwardly directed rim flange to form a stiffening surrounding frame for the top panel, said rim flange extending downwardly from said top panel to a depth which is less than the depths of said food-receiving recess;
   a plurality of cut-outs formed in said panel,
   one cut-out being located between the recess and the first side of the panel and substantially symmetrically with respect to opposite sides of the panel which are disposed laterally with respect to the first side, said cut-out having an edge essentially parallel to the rim of said top panel and forming an essentially smoothly extending line;
   further cut-outs being formed in said panel and positioned along the lateral sides forming the shorter sides of the rectangular panel;
   cutlery means comprising a spoon, a fork, and a knife arranged in said cut-outs and forming an integral part of said tray;
   breakable attaching means retaining said cutlery means in the cut-outs comprising at least two narrow, easily fractured necks extending from projections on the same side of the longitudinal central axis of each of the cutlery means whereby, when the cutlery means are removed from the panel, a side of the panel will form a handle for carrying the tray;
   the recess having sloping side walls, the outer surfaces of said sloping side being formed with ribs to prevent lateral movement with respect to each other if the trays are placed in stacked position;
   the length of the cutlery means being approximately equal to the width of the recesses and the cutlery means having a length less than the length of the food-receiving recess.

* * * * *